United States Patent [19]

Kunimine et al.

[11] 3,903,070

[45] Sept. 2, 1975

[54] AUTOMATIC RESET MECHANISM FOR PUSH BUTTON TELEPHONE SET

[75] Inventors: Isao Kunimine, Kawasaki; Tadashi Minemoto, Tokyo, both of Japan

[73] Assignees: Nippon Tsu Shin Kogyo K.K., Japan; TIE/Communications, Inc., Stamford, Conn.

[22] Filed: Feb. 13, 1974

[21] Appl. No.: 442,077

[30] Foreign Application Priority Data

Sept. 19, 1973 Japan .............................. 48-108733

[52] U.S. Cl. .............. 200/153 H; 179/99; 179/164; 200/5

[51] Int. Cl.[2] ...................... H01H 3/20; H04M 1/08

[58] Field of Search. 200/5 E, 5 EB, 52 R, 61.58 R, 200/153 R, 153 H; 179/90 R, 90 B, 90 BD, 99, 100 C, 100 D, 153, 159–169, 150

[56] References Cited

UNITED STATES PATENTS

| | | | |
|---|---|---|---|
| 911,181 | 2/1909 | Thomson | 179/99 X |
| 982,213 | 1/1911 | Koltonski | 179/99 |
| 2,196,720 | 4/1940 | Beard et al. | 200/61.58 R |
| 2,199,686 | 5/1940 | Beyland | 179/99 |
| 2,511,622 | 6/1950 | Curran et al. | 200/61.58 R X |
| 2,802,904 | 8/1957 | Lehr et al. | 179/99 |
| 3,055,981 | 9/1962 | Smith et al. | 179/160 X |
| 3,440,366 | 4/1969 | Samios | 179/164 |
| 3,601,559 | 8/1971 | Hincline, Jr. | 179/164 |

FOREIGN PATENTS OR APPLICATIONS

| | | | |
|---|---|---|---|
| 688,808 | 3/1953 | United Kingdom | 179/164 |

*Primary Examiner*—James R. Scott

[57] ABSTRACT

An automatic mechanical reset mechanism is described for telephones having circuit selecting, push buttons on the face thereof. Upon the return of the receiver to the telephone cradle, the downward movement of the cradle forces a first lever arm to pivot about a shaft. A second lever arm connected to the same central hub as the first arm similarly rotates and transmits this rotation to a lever plate mechanism. The rotating lever plate communicates with the plate which keeps the button in the depressed condition. The rotation of the lever plate is converted to translational movement of the retention plate thereby releasing the depressed button.

3 Claims, 7 Drawing Figures

AUTOMATIC RESET MECHANISM FOR PUSH BUTTON TELEPHONE SET

BACKGROUND OF THE INVENTION

This invention relates to reset mechanisms for telephones having push buttons on the face thereof but in particular to an automatic, mechanical reset mechanism.

Certain modern day telephone systems are provided with a plurality of push buttons which enable the operator to select anyone of several telephone circuits to converse with others. In prior art systems, when the operator has completed a particular phone call he has had to push a reset button in order to cut-off his telephone receiver from a particular telephone circuit thus enabling others to use that circuit without interference. In addition to the reset button technique, another scheme was developed, which included the use of a electromagnet which was energized when the telephone receiver was replaced on its cradle. The energized magnet resets the push button by means of the magnetic field which had been created.

The reset button technique suffered from the obvious deficiency that people would often times forget to push the reset button. This resulted in an interference with subsequent users of that particular circuit.

Similarly, the electromagnetic technique with its associated electronic accessories introduced undue complexity to the main telephone receiver equipment causing an increase in size and cost.

It is therefore a prime object of this invention to provide a mechanical reset mechanism which automatically resets a particular push button to thereby enable subsequent telephone calls without interference.

It is another object of this invention to provide a reset mechanism which responds to the replacement of the telephone receiver in the telephone cradle by mechanically disengaging the particular push button then depressed.

It is still another object of this invention to provide an automatic reset mechanism which allows the operator to select a particular talking channel by pushing the corresponding button, with the receiver either placed on the cradle or already removed.

SUMMARY OF THE INVENTION

Towards the achievement of these objects there is provided herein a mechanism which responds to the placement of the telephone receiver in the telephone cradle to reset whatever push button might be depressed on the face of the telephone panel. The downward movement of the cradle due to the weight of the receiver placed therein forces a first lever arm to pivot about a shaft in the same direction as the movement of the depressed cradle. This causes a second lever arm which is integral with the same central hub as the first lever arm, to move in a direction opposite to the movement of the cradle and first lever arm. This upward movement of a second lever arm is transmitted to a retention plate, which secure the depressed button in its depressed condition, by means of a lever plate which is rotatably mounted in the main frame of the telephone assembly. As the second lever arm moves up, the lever plate forces the retention plate to a position whereby the push button is released. Upon removal of the receiver from the telephone cradle the second lever arm, due to stored spring energy, is forced to return to its initial position. This enables the reset mechanism and allows it to perform the reset function when the receiver is again, returned to the cradle.

BRIEF DESCRIPTION OF THE DRAWINGS

FIG. 5 is a plan view of the reset mechanism of this invention.

DESCRIPTION OF THE PREFERRED EMBODIMENT

Figure 1:
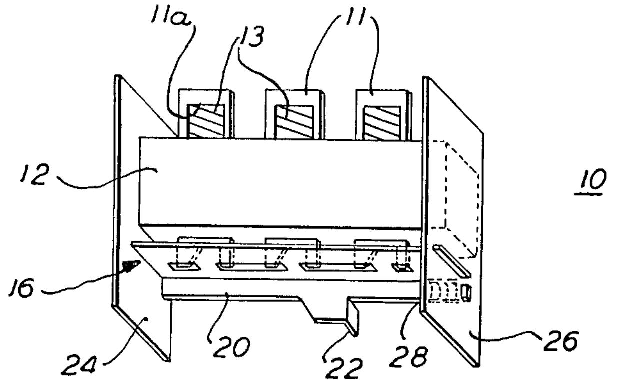
FIG. 1 PRIOR ART
FIG. 1 is a perspective view of a standard interlocking mechanism of a push button telephone.

FIG. 1 depicts a standard interlocking key mechanism 10, which includes a plurality of push button rods 11 (connected to respective push buttons not shown), mounted in a block 12 having clearance holes to enable the rods 11, to pass therethrough. The rods 11 are channel shaped allowing for the placement of compression springs 13 in the channel between edge 11*a* and the top of the block 12 as viewed in FIG. 1. Positioned beneath the block 12 is a stop plate 16 which is configured to include a line of slots 18 positioned colinearly with the openings in block 12 and inline with push button rods 11. Rods 11 have a flange 14 which includes a hooked portion 15 which engages the stop plate 16 when its respective button is depressed. The plate, further includes a downwardly extending flange 20 which in turn includes a flange protrusion 22 perpendicular to flange 20, and which interfaces with the reset mechanism as hereinafter described.

The block 12, along with stop plate 16, is secured between end plates 24 and 26. Positioned between end plate 26 and flange 20 is a coiled spring means, 28. Coiled spring means 28 exerts the necessary pressure on flange 20 so that stop plate 16 is positioned in such a way that the hooked portion 15 of flanges 14 are located above the separations 30 between each of the slots 18 whenever their associated buttons are not depressed.

Figure 2:
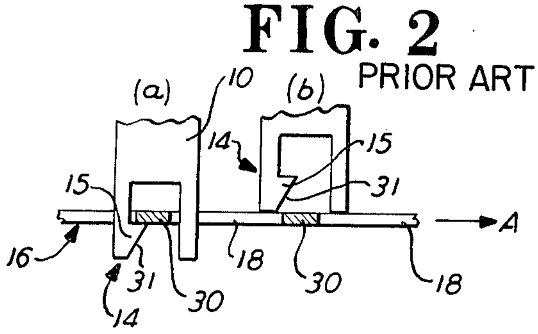
FIG. 2 PRIOR ART
FIG. 2 is a partial, sectional view of the interlocking action for the interlocking mechanism of FIG. 1.

Referring to FIGS. 1 and 2, when any one of the push buttons is depressed, its corresponding push button rod 11 is forced downward. The chamfered edge 31 of flange 14, comes in contact with the separation 30 to thereby force stop plate 16 in the direction, A. Eventually, the hooked portion drops beneath the plane of stop plate 16 and, because of the spring effect of coiled spring 28, plate 16 is then returned to its initial position. This locks the particular button pressed, in the depressed state.

Figures 3, 4:
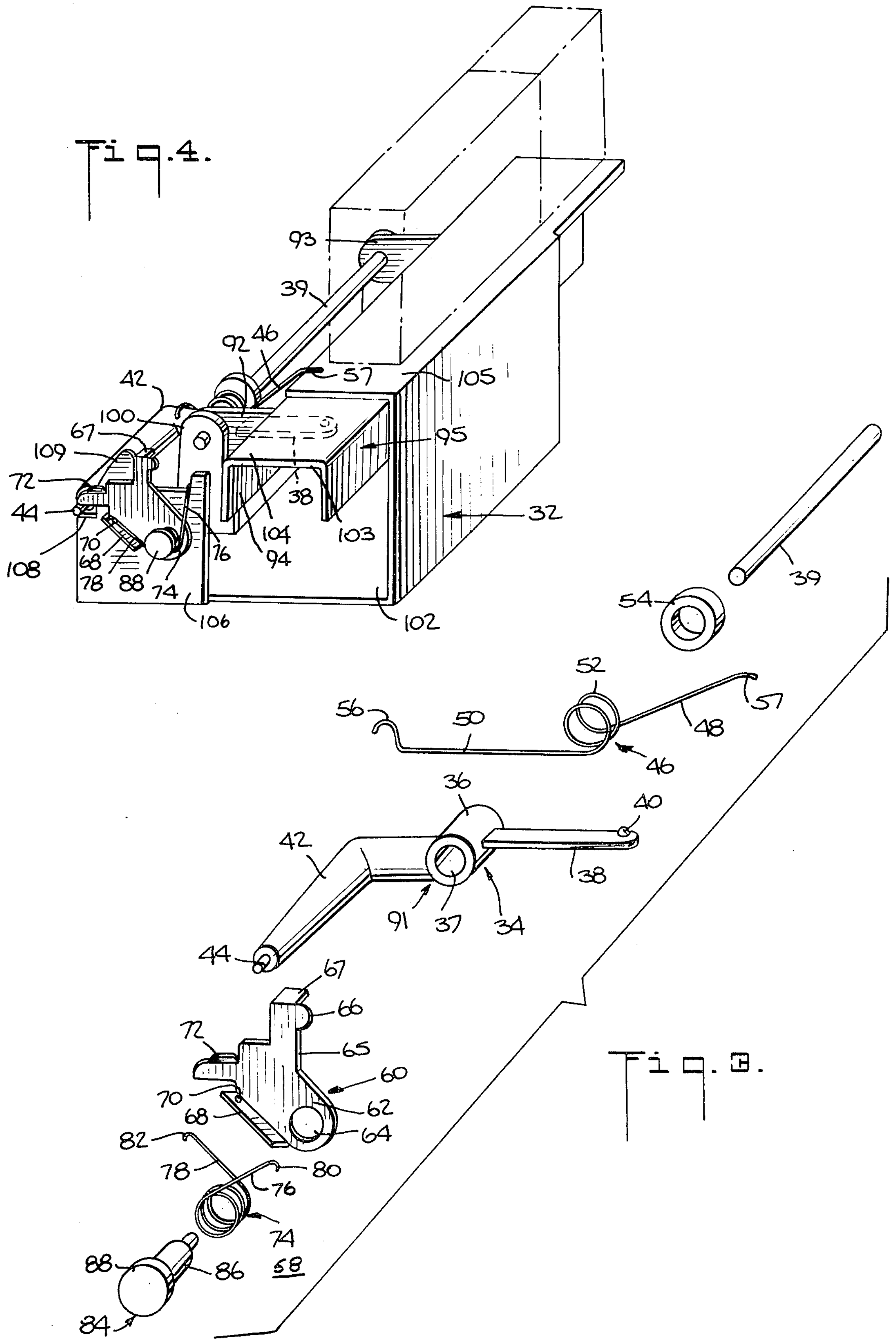
FIG. 3 is an exploded view of a portion of the reset mechanism of the invention.
FIG. 4 is a perspective view of the reset mechanism of this invention.

Referring now to FIG. 3, there is shown an exploded view of the reset mechanism of this invention. The mechanism includes a lever arm assembly 34 which is comprised of a central hub 36 having a basic cylindrical construction with an opening 37 of sufficient diameter to pass a shaft 39. The lever arm assembly includes a first extending arm 38 which protrudes from the central hub, essentially in a direction perpendicular to the longitudinal axis of the assembly 34 and shaft 39. Arm 38, includes a protrusion 40 whose function will be made more apparent later. A "right-angled" arm 42 protrudes from the central hub 36 with the free end of arm 42 aligned parallel to the longitudinal axis of the lever arm assembly 34. Additionally, the free end of arm 42 includes a protrusion 44 whose function will hereinafter be described.

The reset mechanism further includes a coiled spring 46 having arms 48 and 50 extending from opposite ends thereof and tangential to the coiled portion 52 of the spring. The spring is mounted on the central hub 36 and is held in a compressed state by end cap 54 when the end cap is pressed fitted onto hub 36. Extending arms 50 and 48 have hooked portions 56 and 57 respectively, at the extremes thereof. Hook 56 is configured to engage arm 42 as can best be seen in FIG. 5.

Another assembly essential to the operation of the reset mechanism is the lever plate mechanism 58. This also is shown in exploded form in FIG. 3. It includes a lever plate 60, which lies substantially in a plane perpendicular to the longitudinal axis of the lever arm assembly 34. The lever plate 60, includes a main plate portion 62 having an annular cut out 64 for purposes set forth below. A first flange 65 extends vertically, as viewed in FIG. 3, from the main portion 62. Also extending from flange 64, perpendicular to the plane of main plate portion 62, is a second protrusion 67. Its purpose is described hereinafter. Protruding at a right angle from flange 65 but in the same plane as main plate 62, is a protrusion 66 whose purpose will also be seen below. A second flange 68 including a protrusion 70 positioned thereon, extends from main portion 62 in a direction parallel to the longitudinal axis of a lever arm assembly. A third flange 72 contained in the plane of the main portion 62 extends horizontally as viewed in FIG. 3, perpendicular to the direction of the longitudinal axis.

The lever plate mechanism 58, further includes a coiled spring 74 having arms 76 and 78 at opposite ends thereof. Arms 76 and 78 terminate in hooked portions 80 and 82 respectively.

The lever plate mechanism 58 further includes a pin 84 having a central hub 86 of a diameter sufficient to pass through annular cut out 64 in the main plate portion of lever plate 60. The pin 84 further includes an end cap 88 whose purpose is to retain spring 74 when mechanism 58 is assembled to the main frame.

ASSEMBLY

Reference to FIGS. 4 and 5 will show how the previously described lever arm assembly and lever plate assembly are positioned in the main frame 32 of the telephone receiver. End 91 of central hub 36 is positioned flush to the inside wall of flange 92. Flanges 92 and 93 protrude perpendicularly from side wall 94 of a U-Shaped channel 95 which opens downward. The flanges 92 and 93 and spaced such that the outside walls thereof, 96 and 97 respectively, are essentially flush with the inside walls of mounting flanges 100 and 101. Flanges 100 and 101 extend vertically from the bottom plate 102 of main frame 32. A break in side wall 94 allows lever arm 38 to extend into the channel area allowing protrusion 40 to contact the inside surface 103 of the bottom part 104 of the channel. The shaft 39 is passed through appropriately sized openings in flanges 101 and 93, through opening 37 in hub 36 and then through openings in flanges 92 and 100. Hooked portion 57 of spring arm 48 is positioned to engage flange 105, a part of main frame 32, which extends, inwardly and parallel to the bottom plate 102.

Coiled spring 74 is slipped onto hub 86 and compressed between the end cap 88 and the main portion 62 of lever plate 60.

Extending arm 78 lies along flange 68 and is retained in this position through the engagement of hook portion 82 with protrusion 70.

The pin 84 passing through the annular cut out 64 is secured in a suitable manner to a flange 106 which extends from the main frame 32 in a plane perpendicular to the longitudinal axis of shaft 39.

Hook portion 80 engages the top portion of flange 106 so that spring 74 is compressed in one direction about the axis of pin 84 and is also compressed in an axial direction along the axis of pin 84.

The lever plate assembly is thus rotatably secured to the main frame 32.

Flange 106 has an appropriate cut-out 108 which is configured to receive protrusion 44 of arm 42. This cut-out allows protrusion 44 to pass beyond the outside wall of flange 106 and in the off-hook position contact the underside of flange 72 of lever plate 60.

Flange 106 also includes a protrusion 109, which contacts protrusion 67 of flange 64 to thereby prevent counter-rotation of plate 60 when the reset mechanism is returning to its enabling position as hereinafter described.

Figure 6:
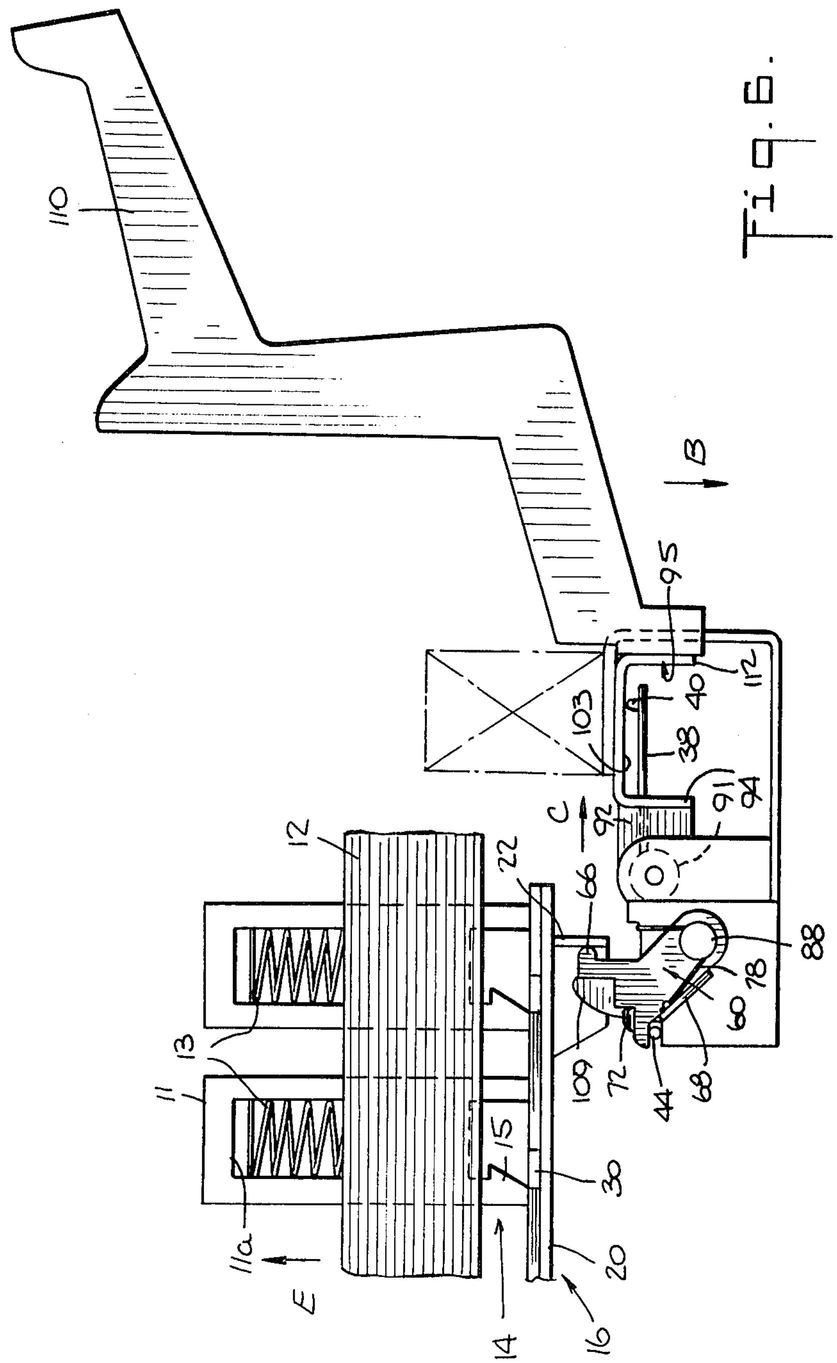
FIG. 6 is an elevation view showing the relationship between the interlocking mechanism of FIG. 1 and the reset mechanism of this invention.

FIG. 6 shows the complete assembly of the interlocking key mechanism and the assembled reset mechanism. Cradle 110 is secured to the outside wall of flange 112 of channel 95. The interlocking mechanism of FIG. 1 is secured to the main frame 32 in such a position that protrusion 66 contacts with slight pressure, the flange protrusion 22 when the telephone receiver is removed from cradle 110. (off-hook position)

OPERATION OF THE INVENTION

Figures 7, 7A, 7B, 7C, 7D, 7E, 8:
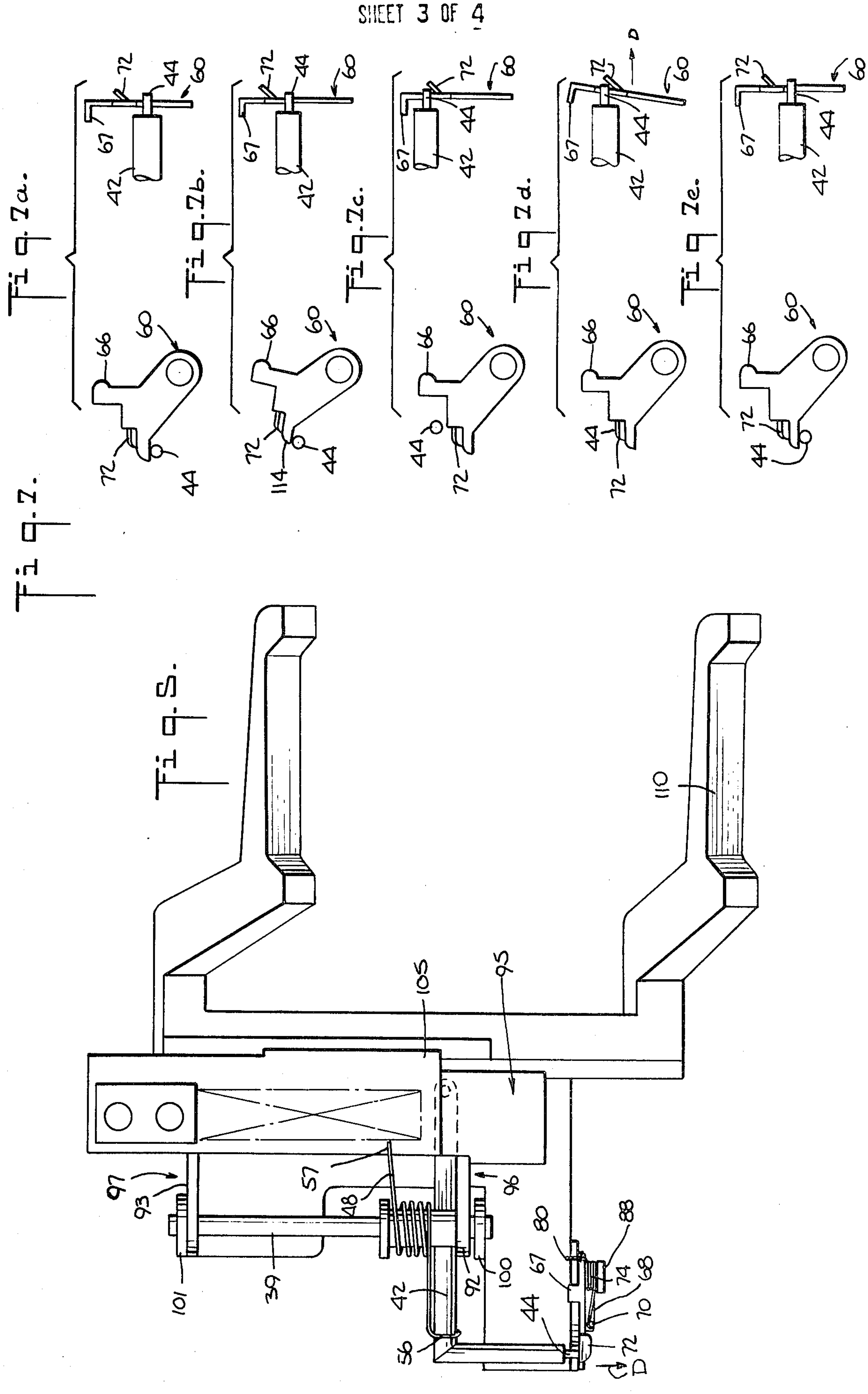
FIGS. 7(*a*) through (*e*) are elevational, front and side, views helpful in understanding the operation of the invention.

Assume for purposes of explanation that the operator has removed the telephone receiver from cradle 110 and has depressed a particular push button in the interlocking key mechanism. The condition or the relationship between the lever arm assembly 34 and the lever plate assembly 58 in particular the relationship between protrusion 44 and flange 72 will be that as shown in FIG. 7(*a*). When the operator returns the receiver to cradle 110 (on hook) the cradle moves in a direction defined by arrow B. Consequently channel 95 also moves in the direction of arrow B. This causes extending arm 38 to rotate about shaft 39 in the same direction. Lever arm 42, naturally, rotates in the direction opposite to that of B. Protrusion 44, engaging the underside of flange 72, forces lever plate 60 to rotate about the axis of pin 84. This rotational movement can be seen from FIG. 7(*b*). This rotational movement of plate 60 is translated to lateral movement of stop plate 16 by the interface of protrusion 66 with flange 22. With the lateral movement of stop plate 16 in the direction A, as seen in FIG. 2, the hooked portion 15 of flange 14 eventually disengages itself from the separation portion 30. Compressed spring 13 positioned between block 12 and edge 11*a* then forces rod 11 in direction E, thus resetting the device. At this point, protrusion 44 has reached the end 114 of flange 72 and continues its movement to a position above flange 72 as shown in FIG. 7(*c*). Flange 72 being returned to the position of FIG. 7(*a*) by the return spring action of spring 74.

The protrusion 44 is returned to its initial position, depicted in FIG. 7(*a*), when the telephone receiver is removed from the cradle 110. FIG. 7(*d*) and (*e*) depict this part of the operation. When the receiver is removed from the cradle the lever arm assembly 44, because of the spring action of coil spring 46, rotates in a counter clockwise direction as viewed in FIG. 6. This rotational action continues until protrusion 40 again comes in contact with the undersurface 103 of channel 95. Arm 42, because of the same spring action is forced downward. Because lever plate 60 is restrained from counter rotational movement by protrusion 67 striking protrusion 109, projection 44 reacts cooperatively with flange 72 to force lever plate 60 in direction D against the compression force of spring 74. This can best be seen from the side elevational view of FIG. 7(*d*). When the projection 44 again reaches a point beneath flange 72 the lever plate 60 is returned to its normal position by the spring pressure of spring 74. The reset mechanism is thus again set to disengage whatever button may be depressed.

It is apparent from a close study of the operation of the reset mechanism, that the reset function can be effected whether or not a given button is depressed prior to or after the receiver is removed from cradle 110.

While the discussion particularly described a telephone positioned in the horizontal plane, it is to be understood that the invention described herein could be readily adapted to vertically positioned telephones as well.

While a particular embodiment has been described herein, it is obvious to those skilled in the art that variations in the design of the various elements of this mechanism can be made without substantially altering the invention as set forth in the appended claims.

What is claimed is:

1. In a key telephone set wherein a stop plate engages and maintains a depressed button in that depressed state, a mechanism for releasing the engaged button when the receiver cradle is despresed which comprises:

a. lever arm assembly means including,
   i. central hub means,
   ii. first and second arms integral with and extending from said central hub means,
   iii. means for rotationally mounting said central hub means relative to the main frame of the telephone,
   iv. means connected between said first arm and said cradle for converting the downward movement of said cradle to rotational movement of said first and second arms about said rotational mounting means;

b. lever plate means including,
   i. a main plate having first and second flanges integral therewith and extending therefrom,
   ii. means for rotationally mounting said main plate to said main frame, said first flange contacting said second arm, such that said main plate rotates in response to the rotational movement of said second arm, said second flange contacting said stop plate, whereby said stop plate moves translationally in response to the rotational movement of said lever plate;

c. first spring means including a first and second extension; and d. second spring means including a third and fourth extension;

said first and third extension contacting said main frame and said second and fourth extension contacting said lever arm assembly means and said lever plate means respectively, such that said first and second spring means store spring energy when said cradle is depressed, said first spring means expending such energy when said depressed cradle is released, thereby forcing the return of the lever arm assembly to the position it had prior to depressing the cradle, said second spring means expending such energy, after said stop plate has moved translationally to release said engaged button, to return said lever plate to the initial position it had prior to depressing the cradle.

2. The mechanism of claim 1 where said lever plate means further includes:

a third flange integral with said main plate and adapted to react with said main frame to thereby prevent counter rotation of said main plate beyond its said initial position when said second spring means expends its stored energy.

3. The mechanism of claim 2 wherein said means for rotationally mounting said main plate to said main frame includes a capped pin passing through a cutout in said main plate said second spring means positioned between said pin cap and said main plate such that it is axially compressible whereby said lever plate means can move axially along said pin in response to the counter rotational movement of said second arm when the spring energy of said first spring is expended.

* * * * *